United States Patent Office.

ASA R. REYNOLDS, OF AUBURN, NEW YORK.

Letters Patent No. 63,096, dated March 19, 1867.

---

IMPROVEMENT IN TEMPERING STEEL AFTER IT HAS BEEN WELDED TO IRON FOR CUTTING-TOOLS.

---

The Schedule referred to in these Letters Patent and making part of the same.

---

TO ALL WHOM IT MAY CONCERN:

Be it known that I, ASA R. REYNOLDS, of Auburn, in the county of Cayuga, and State of New York, have invented certain new and useful Improvements in Tempering Steel after it is Welded to Iron; and I do hereby declare the following to be a full, clear, and exact description of the same.

Much of the cutlery of the present day is made of steel that is welded on to iron, as, for instance, shear blades, plane irons, axes, and many other articles. My invention relates to a mode of tempering the steel portions of such cutting-instruments after it is welded on to the iron which forms a permanent part of it.

In carrying out this invention I use the force and power of a heavy drop-die with slight perpendicular fall, and an under or anvil-die or block, between which and the drop-die the article or steel to be tempered is caught and tightly held, and, in connection with this blow, and grasping or holding, I use the reaction of the die and anvil, as more fully described and illustrated in a patent granted to me on the 28th of August, 1866, by which united operations the steel is compressed and highly tempered.

In my patent above referred to I explained how articles made entirely of steel were tempered by a reactionary blow. Carrying out still further this general principle of tempering, which may be said to embrace in one operation concussion, griping, and continued contact of metal, and the vibrations of the apparatus, resulting from its being placed on an elastic bed of proper material, I have been able to apply the principle to cutting-instruments not made entirely of steel, and to avoid all warping or twisting, which is liable to follow liquid tempering, or the cracking or fracture at the welded point or line. Whilst the liquid tempering sets the steel in the expanded condition of its crystals or fibres, caused by heating it and suddenly cooling it, my process, first, by the blow, condenses the steel, and then, by the griping metallic contact and trembling vibration of the machine, makes it firm, compact, and susceptible of a tempered cutting edge not attained by the liquid tempering. The bed or anvil should be of such form as to receive the article and allow it to remain firm (it being, of course, understood that it is to be previously heated) thereon. The drop-die is let fall upon it, and the reactionary blow it receives accomplishes the tempering, whilst the blow previously condenses the metal, and in that condensed state it is held and tempered. In some cases it may be necessary to repeat the blows, the first blow to accomplish the welding being the heaviest, whilst the subsequent blows to effect the tempering may be reduced in force, such reduction in force being readily accomplished by raising the drop-die or hammer a less distance from the article on which it is to fall. The steel being tempered whilst it is in its most compact form, resulting from the blow of the heavy drop-die, and held so condensed, is susceptible of a cutting edge that cannot be attained by any method of liquid tempering known or practised in this art.

Having thus fully described my invention, what I claim, is—

Tempering steel that is welded on to iron, such as shear blades, plane irons, chisels, axes, or hatchets, and other cutting-tools, by means of a reactionary blow produced by a drop-die or hammer, substantially as herein described and represented.

ASA R. REYNOLDS.

Witnesses:
HORACE T. COOK,
JAS. HENDERSON.